(12) United States Patent
Nishino et al.

(10) Patent No.: US 10,357,851 B2
(45) Date of Patent: Jul. 23, 2019

(54) WAFER PRODUCING METHOD (71) Applicant: DISCO CORPORATION, Tokyo (JP)

(72) Inventors: Yoko Nishino, Tokyo (JP); Kazuya Hirata, Tokyo (JP)

(73) Assignee: DISCO CORPORATION, Tokyo (JP)

( * ) Notice: Subject to any disclaimer, the term of this patent is extended or adjusted under 35 U.S.C. 154(b) by 7 days.

(21) Appl. No.: 15/611,363

(22) Filed: Jun. 1, 2017

(65) Prior Publication Data
US 2017/0348796 A1    Dec. 7, 2017

(30) Foreign Application Priority Data
Jun. 2, 2016    (JP) .................................. 2016-111163

(51) Int. Cl.
*B23K 26/53* (2014.01)
*B28D 5/00* (2006.01)
*B23K 26/00* (2014.01)
*B23K 26/03* (2006.01)
*B23K 26/08* (2014.01)
(Continued)

(52) U.S. Cl.
CPC .......... *B23K 26/53* (2015.10); *B23K 26/0006* (2013.01); *B23K 26/032* (2013.01); *B23K 26/0622* (2015.10); *B23K 26/0823* (2013.01); *B23K 26/0853* (2013.01); *B28D 5/0011* (2013.01); *B23K 2101/40* (2018.08); *B23K 2103/56* (2018.08)

(58) Field of Classification Search
CPC .. Y10T 225/12; B23K 26/53; B23K 26/0057; B23K 26/50; B23K 26/55; B23K 26/57; B23K 26/0054; B23K 26/006; B23K 26/0063; B23K 2201/40; B23K 2203/56; B23K 2101/40; B23K 2103/56; B23K 26/0622; B23K 26/0006; B23K 26/032; B23K 26/0823; B23K 26/0853; B28D 5/0005; B28D 5/0011; B28D 5/0017; B28D 5/023; C03B 33/0222; C03B 33/102; H01L 21/78; H01L 21/304; H01L 21/268
USPC ........................................................ 438/463
See application file for complete search history.

(56) References Cited

U.S. PATENT DOCUMENTS

| 7,642,174 B2 * | 1/2010 | Kobayashi | ......... B23K 26/0057 257/E21.599 |
| 2015/0217400 A1 * | 8/2015 | Yamada | ............. B23K 26/0057 225/2 |

(Continued)

FOREIGN PATENT DOCUMENTS

| JP | 2000-094221 | 4/2000 |
| JP | 2013-049161 | 3/2013 |

*Primary Examiner* — Evan H MacFarlane
(74) *Attorney, Agent, or Firm* — Greer Burns & Crain, Ltd.

(57) ABSTRACT

A wafer producing method for producing an SiC wafer from a single crystal SiC ingot. The wafer producing method includes a separation surface forming step of forming a separation surface composed of modified layers, cracks, and connection layers inside the ingot and a wafer separating step of separating a part of the ingot along the separation surface as an interface to thereby produce the wafer. The separation surface forming step includes a modified layer forming step of forming the modified layers and the cracks extending from the modified layers along a c-plane, and a connection layer forming step of forming the connection layers each connecting the cracks formed adjacent to each other in the thickness direction of the ingot.

2 Claims, 7 Drawing Sheets

(51) Int. Cl.
*B23K 26/0622* (2014.01)
*B23K 103/00* (2006.01)
*B23K 101/40* (2006.01)

(56) References Cited

U.S. PATENT DOCUMENTS

2017/0355041 A1* 12/2017 Yamashita ......... B23K 26/0057
2018/0134604 A1* 5/2018 Ortner ................. C03B 33/0222

* cited by examiner

FIG. 7

WAFER PRODUCING METHOD

BACKGROUND OF THE INVENTION

Field of the Invention

The present invention relates to a wafer producing method for producing an SiC (silicon carbide) wafer from a single crystal SiC ingot.

Description of the Related Art

Various devices such as integrated circuits (ICs), large scale integrations (LSIs), and light emitting diodes (LEDs) are formed by forming a functional layer on the front side of a wafer formed of Si (silicon) or $Al_2O_3$ (sapphire) and partitioning this functional layer into a plurality of separate regions along a plurality of division lines. Further, power devices or optical devices such as LEDs are formed by forming a functional layer on the front side of a wafer formed of single crystal SiC and partitioning this functional layer into a plurality of separate regions along a plurality of division lines. The division lines of such a wafer having these devices are processed by a processing apparatus such as a cutting apparatus and a laser processing apparatus to thereby divide the wafer into a plurality of individual device chips corresponding to the respective devices. The device chips thus obtained are used in various electrical equipment such as mobile phones and personal computers.

In general, the wafer on which the devices are to be formed is produced by slicing a cylindrical ingot with a wire saw. Both sides of the wafer sliced from the ingot are polished to a mirror finish (see Japanese Patent Laid-open No. 2000-94221). However, when the ingot is cut by the wire saw and both sides of each wafer are polished to obtain the product, a large proportion (70% to 80%) of the ingot is discarded to cause a problem of poor economy. In particular, a single crystal SiC ingot has high hardness and it is therefore difficult to cut this ingot with the wire saw. Accordingly, considerable time is required for cutting of the ingot, causing a reduction in productivity. Furthermore, since this ingot is high in unit price, there is a problem in efficiently producing a wafer in this prior art.

A technique for solving this problem has been proposed (see Japanese Patent Laid-open No. 2013-49161). This technique includes the steps of setting the focal point of a laser beam having a transmission wavelength to SiC inside an SiC ingot, next applying the laser beam to the SiC ingot as scanning the laser beam on the ingot to thereby form modified layers in a separation plane previously set inside the ingot, and next breaking the ingot along the separation plane where the modified layers are formed, thus producing an SiC wafer from the SiC ingot.

SUMMARY OF THE INVENTION

However, in producing the SiC wafer from the SiC ingot by using the prior art technique disclosed in Japanese Patent Laid-open No. 2013-49161, there is a problem such that the modified layers must be densely formed with a pitch of approximately 10 μm, causing a reduction in productivity.

It is therefore an object of the present invention to provide a wafer producing method which can improve the productivity of wafers.

In accordance with an aspect of the present invention, there is provided a wafer producing method for producing an SiC wafer from a single crystal SiC ingot having a first surface, a second surface opposite to the first surface, a c-axis extending from the first surface to the second surface, and a c-plane perpendicular to the c-axis, the c-axis being inclined by an off angle with respect to a normal to the first surface, the off angle being formed between the first surface and the c-plane, the wafer producing method including a separation surface forming step of forming a separation surface inside the ingot at a predetermined depth from the first surface, the predetermined depth corresponding to the thickness of the wafer to be produced, the separation surface being composed of a plurality of modified layers linearly extending in a first direction perpendicular to a second direction where the off angle is formed, cracks extending from each modified layer in opposite directions along the c-plane, and a plurality of connection layers extending in a thickness direction of the wafer to be produced, each connection layer connecting the cracks extending from any adjacent ones of the modified layers; and a wafer separating step of separating a part of the ingot along the separation surface as an interface to thereby produce the wafer from the ingot; the separation surface forming step including a modified layer forming step and a connection layer forming step; the modified layer forming step including a first laser processing step of setting a first focal point of a laser beam having a transmission wavelength to SiC at the predetermined depth from the first surface, and next applying the laser beam to the ingot as relatively moving the ingot and the first focal point in the first direction in the condition where the first focal points adjacent to each other are overlapped, and a first indexing step of relatively moving the ingot and the first focal point in the second direction in the condition where the cracks extending from the adjacent modified layers are overlapped with each other as viewed in the thickness direction, after performing the first laser processing step; the first laser processing step and the first indexing step being alternately performed to thereby form the plural modified layers and the cracks; the connection layer forming step including a second laser processing step of setting a second focal point of the laser beam at the predetermined depth from the first surface at a position where the cracks extending from the adjacent modified layers are overlapped with each other as viewed in the thickness direction, and next applying the laser beam to the ingot as relatively moving the ingot and the second focal point in the first direction in the condition where the second focal points adjacent to each other are not overlapped, and a second indexing step of relatively moving the ingot and the second focal point in the second direction after performing the second laser processing step; the second laser processing step and the second indexing step being alternately performed to thereby form the plural connection layers.

Preferably, the connection layer forming step is performed before performing the modified layer forming step.

According to the wafer producing method of the present invention, the separation surface formed in the separation surface forming step is composed of the plural modified layers, the plural cracks, and the plural connection layers, wherein the cracks extending from the adjacent modified layers are connected by the connection layer formed therebetween. Accordingly, a part of the ingot can be easily separated along the separation surface as an interface. Thus, the SiC wafer can be efficiently produced from the single crystal SiC ingot according to the wafer producing method of the present invention. Furthermore, the amount of an ingot portion to be discarded can be reduced to thereby improve the productivity.

The above and other objects, features and advantages of the present invention and the manner of realizing them will become more apparent, and the invention itself will best be understood from a study of the following description and appended claims with reference to the attached drawings showing a preferred embodiment of the invention.

DETAILED DESCRIPTION OF THE PREFERRED EMBODIMENT

Figure 1:
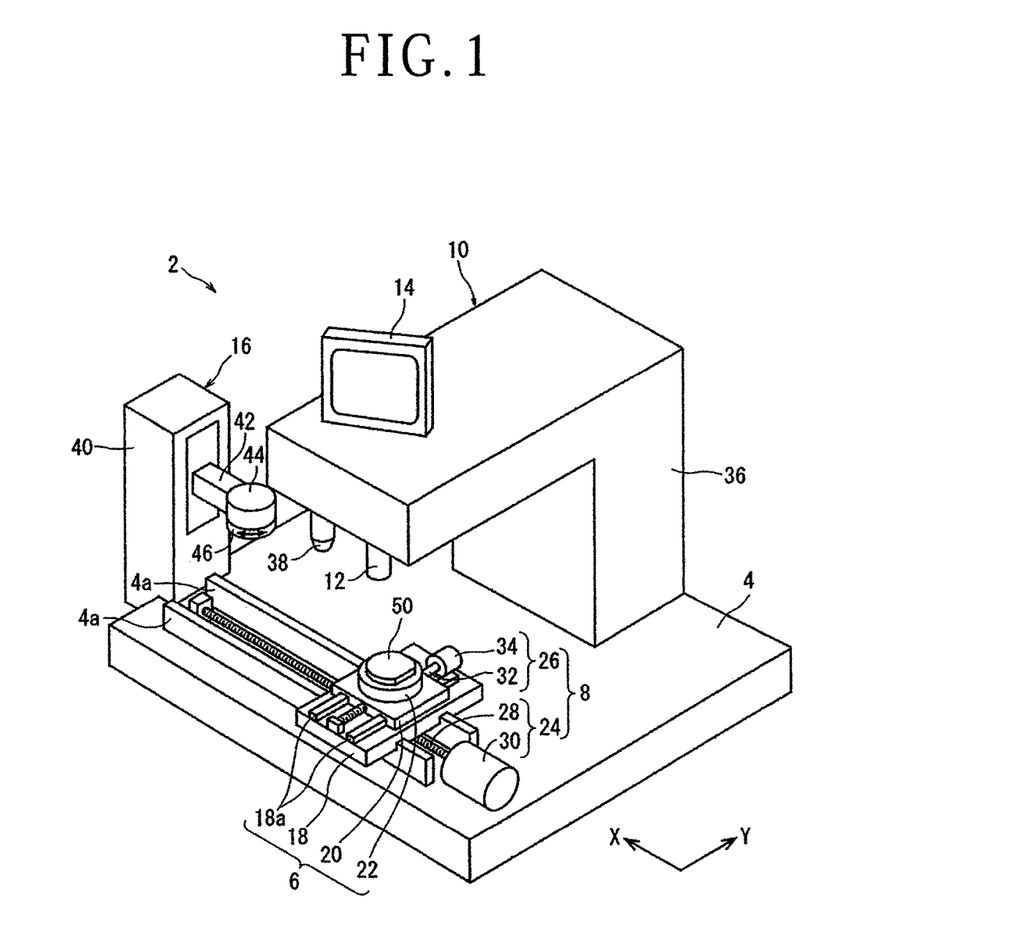
FIG. 1 is a perspective view of a laser processing apparatus.

A preferred embodiment of the wafer producing method according to the present invention will now be described with reference to the drawings. FIG. 1 is a perspective view of a laser processing apparatus 2 for performing the wafer producing method according to this preferred embodiment. The laser processing apparatus 2 shown in FIG. 1 includes a base 4, a chuck table unit 6, moving means 8 for moving the chuck table unit 6, laser beam applying means 10, imaging means 12, display means 14, separating means 16, and control means (not shown).

The chuck table unit 6 includes a rectangular X-direction movable plate 18 mounted on the base 4 so as to be movable in an X direction, a rectangular Y-direction movable plate 20 mounted on the X-direction movable plate 18 so as to be movable in a Y direction, and a cylindrical chuck table 22 rotatably mounted on the upper surface of the Y-direction movable plate 20. The X direction is defined as the direction shown by an arrow X in FIG. 1, and the Y direction is defined as the direction shown by an arrow Y in FIG. 1, which is perpendicular to the X direction in an XY plane. The XY plane defined by the X direction and the Y direction is a substantially horizontal plane.

The moving means 8 includes X-direction moving means 24, Y-direction moving means 26, and rotating means (not shown). The X-direction moving means 24 includes a ball screw 28 extending in the X direction on the base 4 and a motor 30 connected to one end of the ball screw 28. The ball screw 28 has a nut portion (not shown), which is fixed to the lower surface of the X-direction movable plate 18. The X-direction moving means 24 is operated in such a manner that the rotary motion of the motor 30 is converted into a linear motion by the ball screw 28 and this linear motion is transmitted to the X-direction movable plate 18, so that the X-direction movable plate 18 is moved in the X direction along a pair of guide rails 4a provided on the base 4. Similarly, the Y-direction moving means 26 includes a ball screw 32 extending in the Y direction on the X-direction movable plate 18 and a motor 34 connected to one end of the ball screw 32. The ball screw 32 has a nut portion (not shown), which is fixed to the lower surface of the Y-direction movable plate 20. The Y-direction moving means 26 is operated in such a manner that the rotary motion of the motor 34 is converted into a linear motion by the ball screw 32 and this linear motion is transmitted to the Y-direction movable plate 20, so that the Y-direction movable plate 20 is moved in the Y direction along a pair of guide rails 18a provided on the X-direction movable plate 18. The rotating means has a motor (not shown) built in the chuck table 22 to rotate the chuck table 22 with respect to the Y-direction movable plate 20.

The laser beam applying means 10 includes an L-shaped casing 36 provided on the base 4 at its rear end portion, oscillating means (not shown) built in the casing 36, focusing means 38 mounted on the lower surface of the casing 36 at its front end portion, and focal position adjusting means (not shown). The L-shaped casing 36 is composed of a vertical portion extending upward from the upper surface of the base 4 and a horizontal portion extending from the upper end of the vertical portion in a substantially horizontal direction. Although not shown, the oscillating means includes a laser oscillator for oscillating a pulsed laser beam LB, frequency setting means for setting the repetition frequency F of the pulsed laser beam LB to be oscillated from the laser oscillator, and power adjusting means for adjusting the power of the pulsed laser beam LB oscillated from the laser oscillator. The focusing means 38 has a focusing lens (not shown) for focusing the pulsed laser beam LB oscillated from the laser oscillator.

The imaging means 12 is provided on the lower surface of the front end portion of the casing 36 so as to be spaced from the focusing means 38 in the X direction. Although not shown, the imaging means 12 includes an ordinary imaging device (charge coupled device (CCD)) for imaging a workpiece by using visible light, infrared light applying means for applying infrared light to the workpiece, an optical system for capturing the infrared light applied by the infrared light applying means, and an infrared imaging device (infrared CCD) for outputting an electrical signal corresponding to the infrared light captured by the optical system. The display means 14 is mounted on the upper surface of the front end portion of the casing 36 to display an image obtained by the imaging means 12.

The separating means 16 includes a columnar casing 40 extending upward from the upper surface of the base 4 at a position near the left ends of the guide rails 4a as viewed in FIG. 1. The separating means 16 further includes an arm 42 having a base end vertically movably supported to the casing 40 and a front end projecting from the casing 40 so as to extend in the X direction. Although not shown, elevating means for vertically moving the arm 42 is built in the casing 40. A motor 44 is provided at the front end of the arm 42. A disk-shaped suction member 46 is connected to the lower surface of the motor 44 so as to be rotatable around a vertical axis. The lower surface of the suction member 46 is formed with a plurality of suction holes (not shown), which are connected through a suction passage to suction means (not shown). Further, ultrasonic vibration applying means (not shown) is built in the suction member 46 to apply ultrasonic vibration to the lower surface of the suction member 46.

Although not shown, the control means is configured by a computer, which includes a central processing unit (CPU) for performing operational processing in accordance with a control program, a read only memory (ROM) previously storing the control program, and a random access memory (RAM) for temporarily storing operational results etc. The control means is electrically connected to the moving means 8, the laser beam applying means 10, the imaging means 12, the display means 14, and the separating means 16 to control the operation of these means 8, 10, 12, 14, and 16.

Figure 2A:
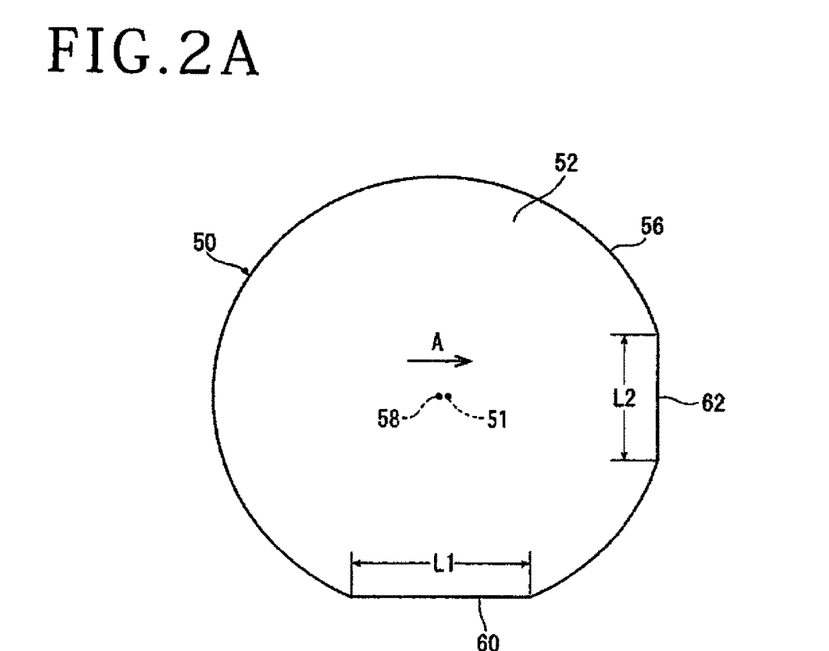
FIG. 2A is a plan view of a single crystal SiC ingot.
Figure 2B:
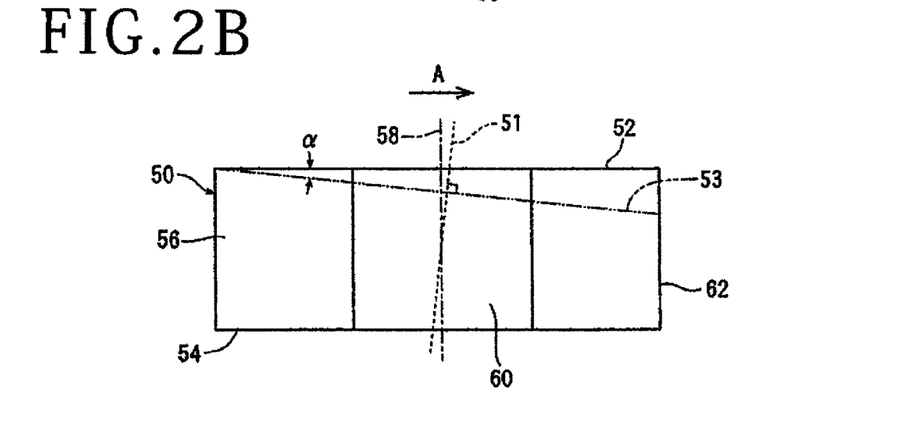
FIG. 2B is an elevational view of the single crystal SiC ingot shown in FIG. 2A.

FIGS. 2A and 2B show a generally cylindrical hexagonal single crystal SiC ingot 50 (which will be hereinafter referred to simply as "ingot 50") as a workpiece to be processed. The ingot 50 has a substantially circular first surface 52, a substantially circular second surface 54 opposite to the first surface 52, a substantially cylindrical surface 56 formed so as to connect the first surface 52 and the second surface 54, a c-axis 51 (<0001> direction) extending from the first surface 52 to the second surface 54, and a c-plane 53 ({0001} plane) perpendicular to the c-axis 51. In the ingot 50, the c-axis 51 is inclined by an off angle α with respect to a normal 58 to the first surface 52. The off angle α (e.g., α=4 degrees) is formed between the c-plane 53 and the first surface 52 (the direction of formation of the off angle α is shown by an arrow A in FIGS. 2A and 2B). Further, the cylindrical surface 56 of the ingot 50 is formed with a first orientation flat 60 and a second orientation flat 62, which are rectangular in side elevation and function to indicate crystal orientation. The first orientation flat 60 is parallel to the direction A of formation of the off angle α, and the second orientation flat 62 is perpendicular to the direction A of formation of the off angle α. As shown in FIG. 2A, which is a plan view taken in the direction of extension of the normal 58, the length L2 of the second orientation flat 62 is set shorter than the length L1 of the first orientation flat 60 (L2<L1).

There will now be described a wafer producing method using the laser processing apparatus 2. First, as shown in FIG. 1, the ingot 50 is fixed to the chuck table 22 in the condition where an adhesive (e.g., epoxy resin adhesive) is interposed between the second surface 54 of the ingot 50 and the upper surface of the chuck table 22. Thereafter, the moving means 8 is operated to move the chuck table 22 to a position below the imaging means 12, and the imaging means 12 is next operated to image the ingot 50.

Figure 3A:
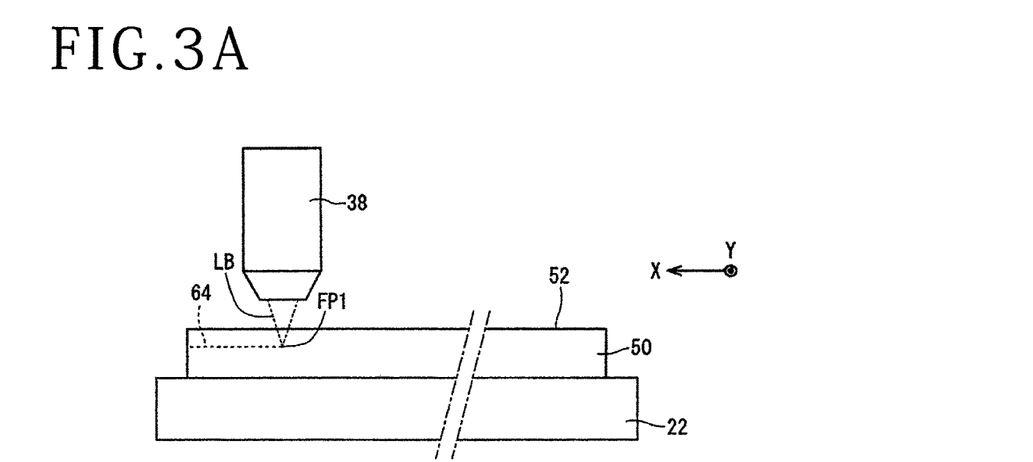
FIG. 3A is an elevational view showing a connection layer forming step.
Figure 3B:
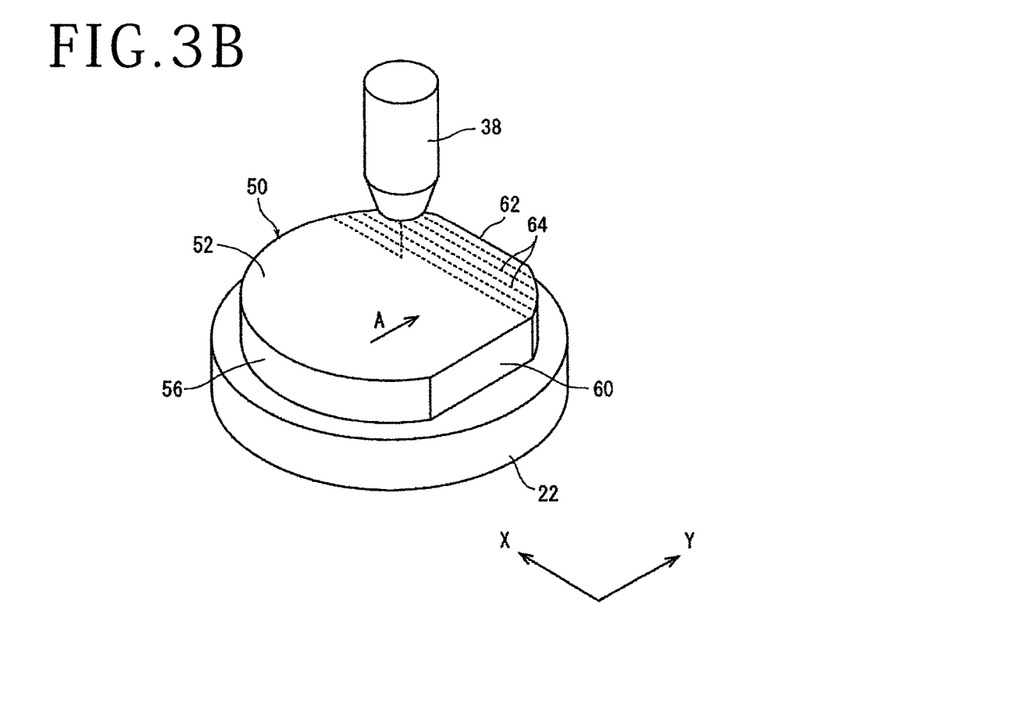
FIG. 3B is a perspective view showing the connection layer forming step shown in FIG. 3A.

Thereafter, a separation surface forming step is performed. The separation surface forming step includes a connection layer forming step and a modified layer forming step. In this preferred embodiment, the connection layer forming step is performed before performing the modified layer forming step. In the connection layer forming step, the moving means 8 is first operated to move and rotate the chuck table 22 according to the image of the ingot 50 detected by the imaging means 12, thereby adjusting the orientation of the ingot 50 to a predetermined orientation and also adjusting the positional relation between the ingot 50 and the focusing means 38 in the XY plane. In adjusting the orientation of the ingot 50 to a predetermined orientation, the first orientation flat 60 is made parallel to the Y direction and the second orientation flat 62 is made parallel to the X direction as shown in FIG. 3B. Accordingly, the direction A of formation of the off angle α is made parallel to the Y direction, and the direction perpendicular to the direction A of formation of the off angle α is made parallel to the X direction. Further, in adjusting the positional relation between the ingot 50 and the focusing means 38 in the XY plane, the focal point FP1 of a pulsed laser beam LB to be applied from the focusing means 38 is set inside the ingot 50 at a horizontal position where cracks 68 extending from adjacent modified layers 66 to be formed later in the modified layer forming step are overlapped as viewed in the thickness direction of the ingot 50.

Figures 4A, 4B:
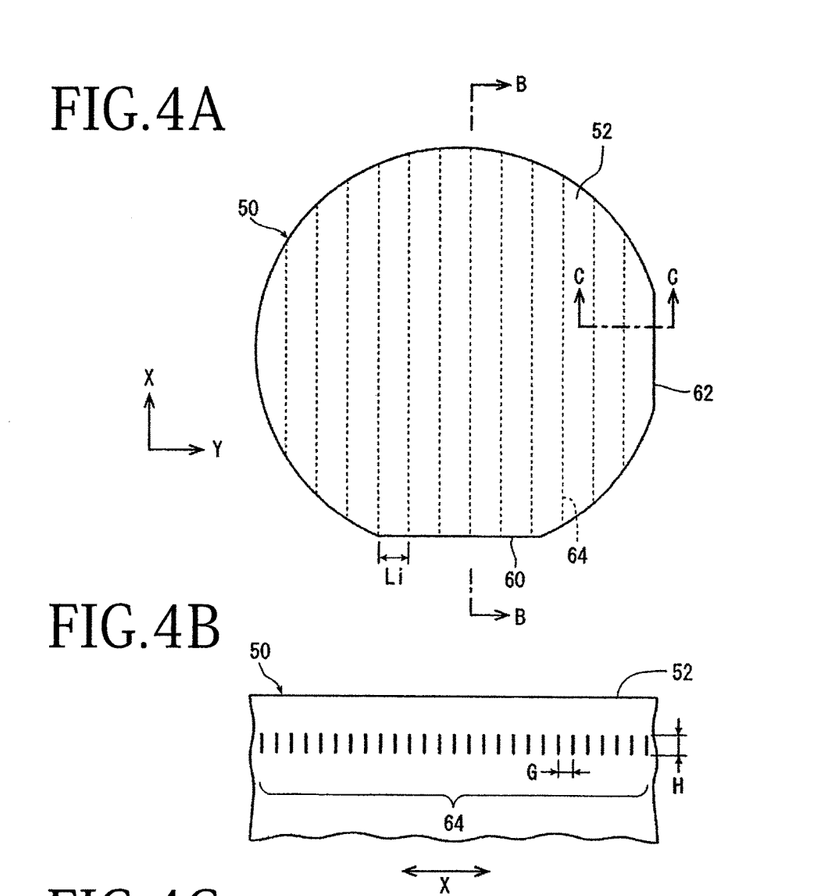
FIG. 4A is a plan view of the single crystal SiC ingot in which a plurality of connection layers have been formed by performing the connection layer forming step.
FIG. 4B is a cross section taken along the line B-B in FIG. 4A.
Figure 4C:
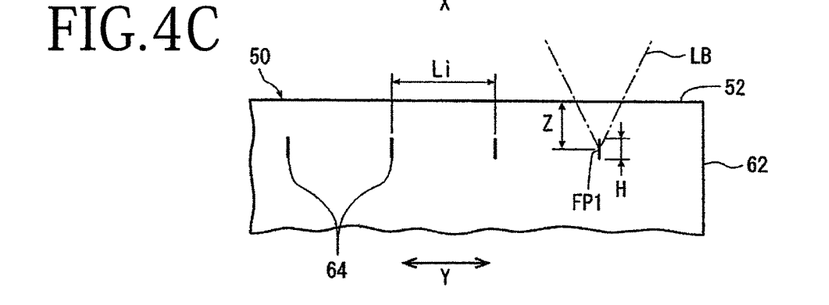
FIG. 4C is a cross section taken along the line C-C in FIG. 4A.

Furthermore, the focal position adjusting means is operated to vertically move the focusing means 38, thereby setting the focal point FP1 at a predetermined depth from the first surface 52 of the ingot 50, wherein this depth corresponds to the thickness of a wafer to be produced. Thereafter, as shown in FIGS. 3A and 3B, the pulsed laser beam LB having a transmission wavelength to SiC is applied from the focusing means 38 to the ingot 50 as moving the chuck table 22 relative to the focal point FP1 at a predetermined feed speed V in the X direction (i.e., in the direction perpendicular to the direction A of formation of the off angle α) by operating the X moving means 24 in the condition where the adjacent focal points FP1 are not overlapped with each other. Thus, connection layer formation processing is performed along a line in the X direction. That is, as shown in FIG. 4B, a plurality of connection layers 64 are formed inside the ingot 50 along a line so as to be arranged at given intervals in the X direction, wherein each connection layer 64 extends in the thickness direction of the wafer to be processed. As shown in FIG. 4C, each connection layer 64 as an amorphous region extends upward and downward from the focal point FP1 in the thickness direction of the wafer to be produced. The dimension H of each connection layer 64 in the thickness direction of the wafer to be produced is approximately 18 to 20 μm, for example. After performing the connection layer forming step along a line as mentioned above, indexing is performed in such a manner that the chuck table 22 is moved relative to the focal point FP1 by a predetermined index amount Li in the Y direction (i.e., in the direction A of formation of the off angle α) by operating the Y-direction moving means 26 as shown in FIG. 4C. Thereafter, the connection layer formation processing and the indexing mentioned above are alternately performed. For example, the connection layer forming step mentioned above may be performed under the following processing conditions.

Wavelength of the pulsed laser beam LB: 1064 nm
Repetition frequency F: 35 kHz
Average power P: 0.7 W
Diameter D of the focal point FP1: 3 μm
Depth Z of the focal point FP1: 70 μm from the first surface 52
Power density W: 2.83 J/mm$^2$
Index amount Li: 250 μm
Feed speed V: 300 mm/second
Overlap rate of the adjacent focal points FP1: 0%

To ensure that the adjacent focal points FP1 are not overlapped with each other in the connection layer forming step, the relation of G=(V/F)−D>0 must hold, where F is the repetition frequency (kHz), V is the feed speed (mm/second), and D is the diameter (μm) of the focal point FP1. In the case of the above processing conditions, the following value is given for G.

$$G = \{300 \text{ (mm/second)}/35 \text{ (kHz)}\} - 3 \text{ (µm)}$$
$$= \{300 \times 10^3 \text{ (µm/second)}/35 \times 10^3 \text{ (Hz)}\} - 3 \text{ (µm)}$$
$$= +5.6 \text{ (µm)} > 0$$

Accordingly, the adjacent focal points FP1 are not overlapped in the above processing conditions. In the case that G>0, G means the spacing (µm) between the adjacent focal points FP1. The power density W (J/mm²) is defined by the average power P (W), the area $\pi D^2/4$ (µm²) of the focal point FP1, and the repetition frequency F (kHz) to give W=4P/$\pi D^2$F.

Figure 5A:
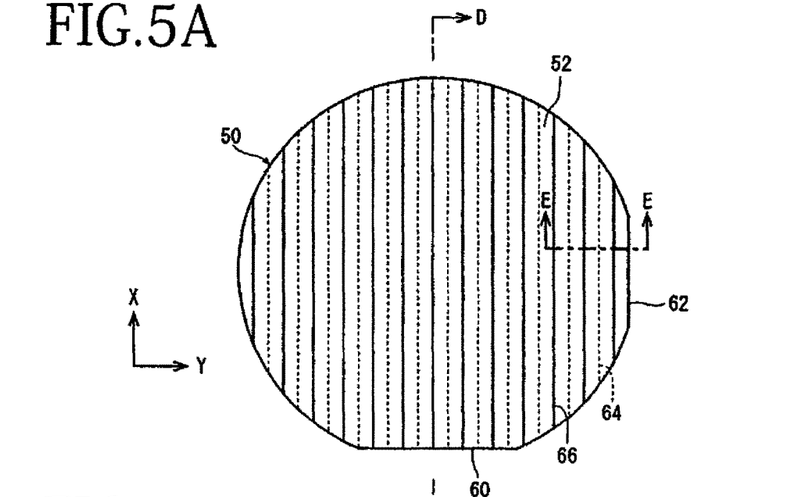
FIG. 5A is a plan view of the single crystal SiC ingot in which a plurality of modified layers and cracks have been formed in addition to the plural connection layers by performing a modified layer forming step.
Figure 5B:
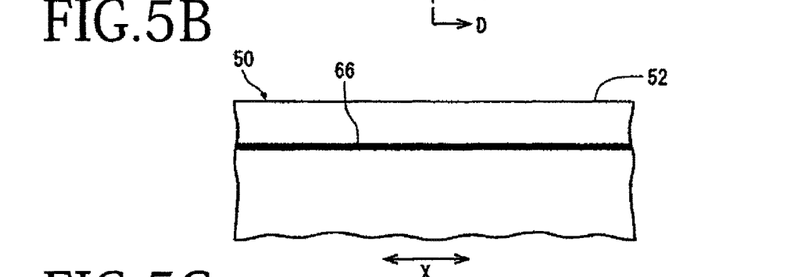
FIG. 5B is a cross section taken along the line D-D in FIG. 5A.
Figure 5C:
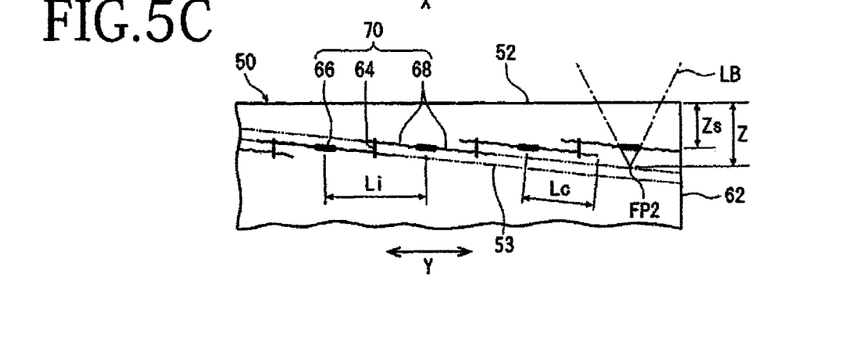
FIG. 5C is a cross section taken along the line E-E in FIG. 5A.

After performing the connection layer forming step, the modified layer forming step is performed in the following manner. In the modified layer forming step, the moving means 8 is first operated to move and rotate the chuck table 22 according to the image of the ingot 50 detected by the imaging means 12, thereby adjusting the orientation of the ingot 50 to a predetermined orientation and also adjusting the positional relation between the ingot 50 and the focusing means 38 in the XY plane. In adjusting the orientation of the ingot 50 to a predetermined orientation, the first orientation flat 60 is made parallel to the Y direction and the second orientation flat 62 is made parallel to the X direction as in the connection layer forming step. Accordingly, the direction A of formation of the off angle α is made parallel to the Y direction, and the direction perpendicular to the direction A of formation of the off angle α is made parallel to the X direction. Further, in adjusting the positional relation between the ingot 50 and the focusing means 38 in the XY plane, the focal point FP2 of a pulsed laser beam LB to be applied from the focusing means 38 is set inside the ingot 50 at a horizontal position between the adjacent connection layers 64 spaced from each other in the direction A of formation of the off angle α. Furthermore, the focal position adjusting means is operated to vertically move the focusing means 38, thereby setting the focal point FP2 at a predetermined depth from the first distance 52 of the ingot 50, wherein this depth corresponds to the thickness of the wafer to be produced. Thereafter, the pulsed laser beam LB having a transmission wavelength to SiC is applied from the focusing means 38 to the ingot 50 as moving the chuck table 22 relative to the focal point FP2 at a predetermined feed speed V in the X direction (i.e., in the direction perpendicular to the direction A of formation of the off angle α) by operating the X moving means 24 in the condition where the adjacent focal points FP2 are overlapped with each other. Thus, modified layer formation processing is performed along a line in the X direction. That is, as shown in FIG. 5B, a straight modified layer 66 is continuously formed inside the ingot 50 along a line so as to extend in the X direction (i.e., in the direction perpendicular to the direction A of formation of the off angle α). As shown in FIG. 5C, the modified layer 66 formed in a line extending in the X direction is present on substantially the same c-plane 53 and flattened along the c-plane 53. Further, the modified layer 66 has void. Further, in forming the modified layer 66, cracks 68 propagate from the modified layer 66 in opposite directions along the c-plane 53. That is, the cracks 68 are formed on both sides of the modified layer 66 along the c-plane 53. The length Lc of the cracks 68 formed on one side of the modified layer 66 along the c-plane 53 is approximately 250 µm.

The process of formation of the modified layer 66 will now be described in more detail. Initially, the pulsed laser beam LB is applied to form an initial modified layer 66 at the focal point FP2 and around the focal point FP2, wherein SiC is decomposed into Si (silicon) and C (carbon) in this initial modified layer 66. In the modified layer formation processing, the pulsed laser beam LB is applied to the ingot 50 as moving the chuck table 22 relative to the focal point FP2 in the X direction in the condition where the adjacent focal points FP2 are overlapped with each other. Accordingly, the pulsed laser beam LB is applied again to the initial modified layer 66 in which SiC has been decomposed into Si (silicon) and C (carbon). As a result, the pulsed laser beam LB applied is absorbed by C (carbon) present in the initial modified layer 66, so that the next modified layer 66 is formed at a depth slightly shallower than the depth of the focal point FP2. In this manner, the subsequent modified layer 66 extends from the initial modified layer 66 in the direction perpendicular to the direction A of formation of the off angle α so as to be slightly inclined upward toward the light entrance side (the first surface 52) where the pulsed laser beam LB is applied.

Figure 6A:
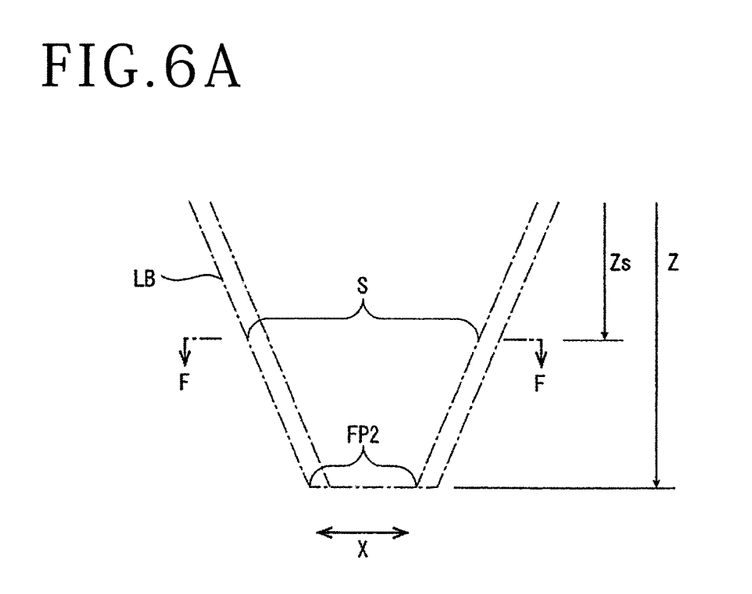
FIG. 6A is a schematic view showing a laser beam in the modified layer forming step.

More specifically, the modified layer 66 in the ingot 50 extends from the initial position where the focal point FP2 is set and the power density W of the pulsed laser beam LB is high, in the direction perpendicular to the direction A of formation of the off angle α so as to be slightly inclined upward toward the light entrance side where the power density W of the pulsed laser beam LB is low. When the depth of the modified layer 66 thus formed reaches a depth Zs of a spot S (see FIG. 6) where the power density W of the pulsed laser beam LB becomes a predetermined value Ws, the modified layer 66 extends in the direction perpendicular to the direction A of formation of the off angle α without being inclined upward toward the light entrance side. In the modified layer formation processing, the chuck table 22 is moved relative to the focal point FP2 in the X direction in the condition where the adjacent focal points FP2 are overlapped with each other. Accordingly, also as the depth Zs shallower than the depth Z of the focal point FP2, the adjacent spots S are overlapped with each other. Thereafter, the modified layer 66 is continuously formed at the depth Zs of the spot S. The difference between the depth Z of the focal point FP2 and the depth Zs of the spot S with reference to the first surface 52 is approximately 10 µm, and the range where the modified layer 66 is inclined toward the light entrance side is approximately 20 µm.

After performing the modified layer formation processing along a line as mentioned above, indexing is performed in such a manner that the chuck table 22 is moved relative to the focal point FP2 by a predetermined amount Li in the Y direction (i.e., in the direction A of formation of the off angle α) by operating the Y-direction moving means 26 in the condition where the cracks 68 extending from the adjacent modified layers 66 are overlapped with each other as viewed in the thickness direction of the ingot 50 as shown in FIG. 5C. As described above, the length Lc of the cracks 68 formed on one side of the modified layer 66 along the c-plane 53 is approximately 250 µm. Accordingly, by setting the index amount Li to less than or equal to approximately 500 µm, the cracks 68 extending from the adjacent modified layers 66 are overlapped with each other as viewed in the thickness direction of the ingot 50, wherein a slight gap is partially left between the cracks 68. Thereafter, the modified layer formation processing and the indexing mentioned above are alternately performed. As a result, a plurality of modified layers 66 are formed inside the ingot 50 so as to be spaced from each other in the direction A of formation of the off angle α as shown in FIG. 5A. For example, the modified layer forming step mentioned above may be performed under the following processing conditions.

Wavelength of the pulsed laser beam LB: 1064 nm
Repetition frequency F: 60 kHz
Average power P: 1.5 W
Diameter D of the focal point FP2: 3 μm
Depth Z of the focal point FP2: 80 μm from the first surface 52
Diameter Ds of the spot S: 5.3 μm
Depth Zs of the spot S: 70 μm from the first surface 52
Power density Ws at the spot S: 1.13 J/mm$^2$
Index amount Li: 250 μm
Feed speed V: 60 mm/second
Overlap rate of the adjacent focal points FP2: 67%
Overlap rate of the adjacent spots S: 81%

The power density Ws (J/mm$^2$) at the spot S in the above processing conditions is defined by the average power P (W), the area $\pi(Ds)^2/4$ (μm$^2$) of the spot S, and the repetition frequency F (kHz) to give Ws=4P/$\pi(Ds)^2$F.

To ensure that the adjacent focal points FP2 are overlapped with each other in the modified layer forming step, the relation of G=(V/F)−D<0 must hold, where F is the repetition frequency (kHz), V is the feed speed (mm/second), and D is the diameter (μm) of the focal point FP2. In the case of the above processing conditions, the following value is given for G.

$$G = \{60 \text{ (mm/second)}/60 \text{ (kHz)}\} - 3 \text{ (μm)}$$
$$= \{60 \times 10^3 \text{ (μm/second)}/60 \times 10^3 \text{ (Hz)}\} - 3 \text{ (μm)}$$
$$= -2 \text{ (μm)} < 0$$

Accordingly, the adjacent focal points FP2 are overlapped in the above processing conditions. In the case that G<0, the overlap rate of the adjacent focal points FP2 is defined as |G|/D. Further, to ensure that the adjacent spots S are overlapped with each other, the relation of Gs=(V/F)−Ds<0 must hold, where F is the repetition frequency (kHz), V is the feed speed (mm/second), and Ds is the diameter (μm) of the spot S. In the case of the above processing conditions, the following value is given for Gs.

$$Gs = \{60 \text{ (mm/second)}/60 \text{ (kHz)}\} - 5.3 \text{ (μm)}$$
$$= \{60 \times 10^3 \text{ (μm/second)}/60 \times 10^3 \text{ (Hz)}\} - 5.3 \text{ (μm)}$$
$$= -4.3 \text{ (μm)} < 0$$

Figure 6B:
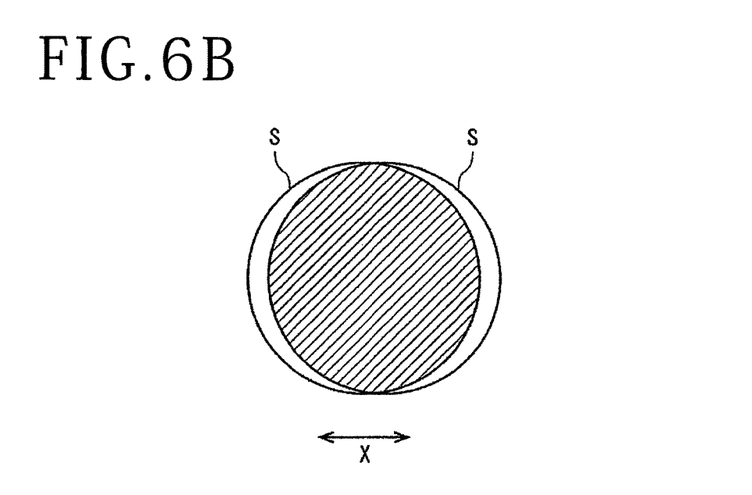
FIG. 6B is a cross section taken along the line F-F in FIG. 6A.

Accordingly, the adjacent spots S are overlapped in the above processing conditions. In the case that Gs<0, the overlap rate of the adjacent spots S is defined as |Gs|/Ds. In FIG. 6B, an overlapped portion of the adjacent spots S is hatched.

In this manner, the separation surface forming step is performed by performing the connection layer forming step and the modified layer forming step to form a separation surface 70 inside the ingot 50 at the depth corresponding to the thickness of the wafer to be produced, from the first surface 52 of the ingot 50 as shown in FIG. 5C, wherein the separation surface 70 is composed of the plural modified layers 66, the plural cracks 68, and the plural connection layers 64. In the case that the off angle α is 4 degrees and the index amount Li set in the modified layer forming step is 250 μm as in this preferred embodiment, the distance between the cracks 68 extending from the adjacent modified layers 66 is approximately 17 to 18 μm as measured in the thickness direction of the wafer to be produced. Accordingly, when the dimension H of each connection layer 64 in the thickness direction of the wafer to be produced is greater than approximately 17 to 18 μm, the cracks 68 extending from the adjacent modified layers 66 are connected with each other by the connection layer 64 formed therebetween as shown in FIG. 5C.

Figure 7:
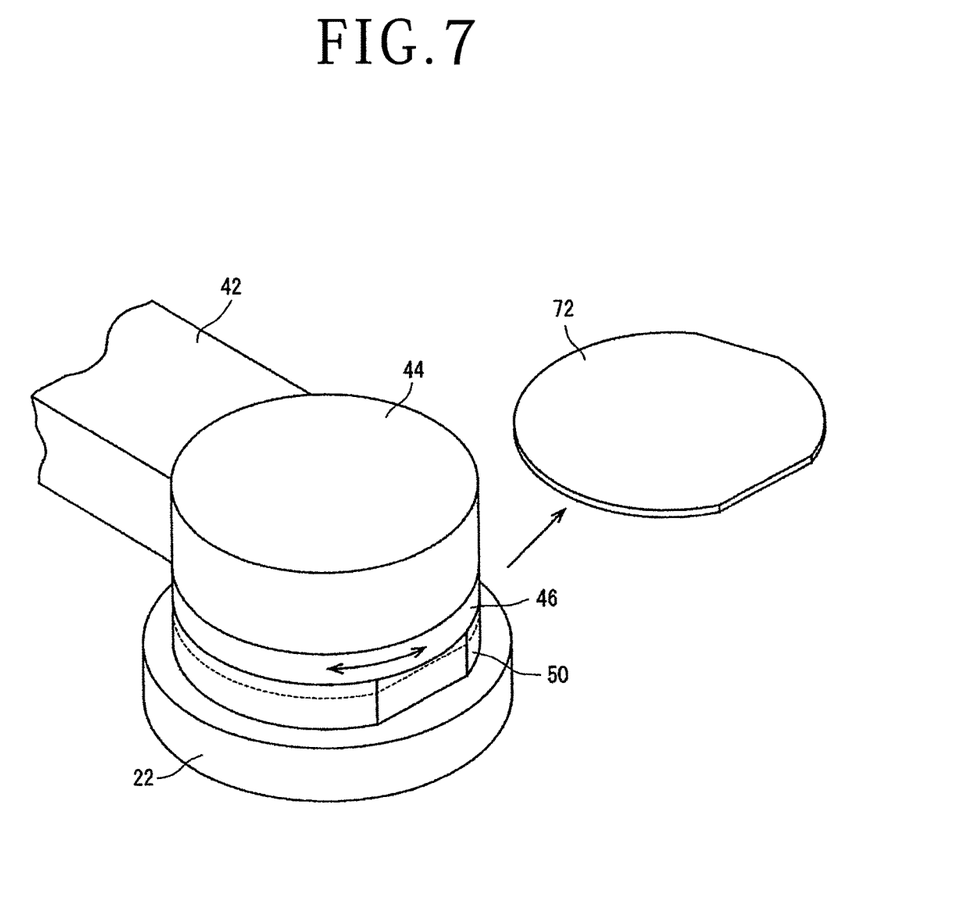
FIG. 7 is a perspective view showing a wafer separating step.

After performing the separation surface forming step, a wafer separating step is performed. In the wafer separating step, the moving means 8 is first operated to move the chuck table 22 to a position below the suction member 46. Thereafter, the elevating means provided in the casing 40 is operated to lower the arm 42 until the lower surface of the suction member 46 comes into close contact with the first surface 52 of the ingot 50 as shown in FIG. 7. Thereafter, the suction means connected to the suction member 46 is operated to hold the first surface 52 of the ingot 50 to the lower surface of the suction member 46 under suction. Thereafter, the ultrasonic vibration applying means built in the suction member 46 is operated to apply ultrasonic vibration to the lower surface of the suction member 46. At the same time, the motor 44 is operated to rotate the suction member 46. As a result, a part of the ingot 50 can be separated along the separation surface 70 as an interface to thereby efficiently produce a wafer 72 having a desired thickness as shown in FIG. 7. As described above, the separation surface 70 formed in the separation surface forming step is composed of the plural modified layers 66, the plural cracks 68, and the plural connection layers 64, wherein the cracks 68 extending from the adjacent modified layers 66 are connected by the connection layer 64 formed therebetween. Accordingly, a part of the ingot 50 can be easily separated along the separation surface 70 as an interface. After producing the wafer 72, the separation surface 70 of the ingot 50 remaining is polished by using polishing means (not shown) provided on the base 4. Thereafter, the separation surface forming step and the wafer separating step are sequentially performed in a similar manner to produce a plurality of wafers from the ingot 50. Accordingly, the amount of an ingot portion to be discarded can be reduced to thereby improve the productivity.

While the connection layer forming step is performed before performing the modified layer forming step in the separation surface forming step in the above preferred embodiment, the modified layer forming step may be performed before performing the connection layer forming step.

The present invention is not limited to the details of the above described preferred embodiment. The scope of the invention is defined by the appended claims and all changes and modifications as fall within the equivalence of the scope of the claims are therefore to be embraced by the invention.

What is claimed is:

1. A wafer producing method for producing an SiC wafer from a single crystal SiC ingot having a first surface, a second surface opposite to said first surface, a c-axis extending from said first surface to said second surface, and a c-plane perpendicular to said c-axis, said c-axis being inclined by an off angle with respect to a normal to said first surface, said off angle being formed between said first surface and said c-plane, said wafer producing method comprising:

a separation surface forming step of forming a separation surface inside said ingot at a predetermined depth from said first surface, said predetermined depth corresponding to a thickness of said wafer to be produced, said separation surface being composed of a plurality of modified layers linearly extending in a first direction perpendicular to a second direction where said off angle is formed, cracks extending from each of said modified layers in opposite directions along said c-plane, and a plurality of connection layers extending in a thickness direction of said wafer to be produced, each of said connection layers connecting said cracks extending from any adjacent ones of said modified layers; and a wafer separating step of separating a part of said ingot along said separation surface as an interface to thereby produce said wafer from said ingot;

said separation surface forming step including a modified layer forming step and a connection layer forming step;

said modified layer forming step including:

a first laser processing step of setting a first focal point of a laser beam at said predetermined depth from said first surface, and next applying said laser beam to said ingot as relatively moving said ingot and said first focal point in said first direction such that a location of said first focal point prior to said relative movement and a location of said first focal point after said relative movement overlap each other; and a first indexing step of relatively moving said ingot and said first focal point in said second direction, such that after performing said modified layer forming step, said cracks extending from said adjacent ones of said modified layers are overlapped with each other as viewed in said thickness direction, said first laser processing step and said first indexing step being alternately performed to thereby form said plurality of modified layers and said cracks;

said connection layer forming step including:

a second laser processing step of setting a second focal point of said laser beam at said predetermined depth from said first surface at a position where, following performance of the modified layer forming step, said cracks extending from said adjacent ones of said modified layers are overlapped with each other as viewed in said thickness direction, and next applying said laser beam to said ingot as relatively moving said ingot and said second focal point in said first direction such that a location of said second focal point prior to said relative movement and a location of said second focal point after said relative movement do not overlap each other; and a second indexing step of relatively moving said ingot and said second focal point in said second direction after performing said second laser processing step;

said second laser processing step and said second indexing step being alternately performed to thereby form said plurality of connection layers, wherein said connection layer forming step is performed after performing said modified layer forming step.

2. A wafer producing method for producing an SiC wafer from a single crystal SiC ingot having a first surface, a second surface opposite to said first surface, a c-axis extending from said first surface to said second surface, and a c-plane perpendicular to said c-axis, said c-axis being inclined by an off angle with respect to a normal to said first surface, said off angle being formed between said first surface and said c-plane, said wafer producing method comprising:

a separation surface forming step of forming a separation surface inside said ingot at a predetermined depth from said first surface, said predetermined depth corresponding to a thickness of said wafer to be produced, said separation surface being composed of a plurality of modified layers linearly extending in a first direction perpendicular to a second direction where said off angle is formed, cracks extending from each of said modified layers in opposite directions along said c-plane, and a plurality of connection layers extending in a thickness direction of said wafer to be produced, each of said connection layers connecting said cracks extending from any adjacent ones of said modified layers; and a wafer separating step of separating a part of said ingot along said separation surface as an interface to thereby produce said wafer from said ingot;

said separation surface forming step including a connection layer forming step and a modified layer forming step;

said connection layer forming step including:

a first laser processing step of setting a first focal point of a laser beam at said predetermined depth from said first surface, and next applying said laser beam to said ingot as relatively moving said ingot and said first focal point in said first direction such that a location of said first focal point prior to said relative movement and a location of said first focal point after said relative movement do not overlap each other; and a first indexing step of relatively moving said ingot and said first focal point in said second direction after performing said first laser processing step;

said first laser processing step and said first indexing step being alternately performed to thereby form said plurality of connection layers, said modified layer forming step including:

a second laser processing step of setting a second focal point of said laser beam at said predetermined depth from said first surface, and next applying said laser beam to said ingot as relatively moving said ingot and said second focal point in said first direction such that a location of said second focal point prior to said relative movement and a location of said second focal point after said relative movement overlap each other; and a second indexing step of relatively moving said ingot and said second focal point in said second direction, such that after performing said modified layer forming step, said cracks extending from said adjacent ones of said modified layers are overlapped with each other as viewed in said thickness direction, said second laser processing step and said second indexing step being alternately performed to thereby form said plurality of modified layers and said cracks;

wherein said connection layer forming step is performed before performing said modified layer forming step, and wherein the separation surface resulting from said connection layer forming step and said modified layer forming step includes each of said connection layers connecting overlapping ones of said cracks extending from said adjacent ones of said modified layers.

* * * * *